3,451,968
COMPOSITION COMPRISING UREA-FORMALDE-
HYDE RESIN, TRIESTER OF $H_3PO_4$, AND ALKYL
PHOSPHITE
James K. Akiyama, Mountain View, Calif., assignor to
Diamond Shamrock Corporation, a corporation of
Delaware
No Drawing. Filed July 26, 1965, Ser. No. 474,982
Int. Cl. C08g 9/10
U.S. Cl. 260—71    8 Claims

ABSTRACT OF THE DISCLOSURE

A faster cure of urea formaldehyde resins is obtained by employing a latent catalyst which will rapidly release the acid necessary for curing on exposure to heat. The latent catalyst of this invention comprises a mixture of a triester of phosphoric acid, e.g., a trialkyl phosphate and as an activator therefor a trialkyl phosphite.

---

This invention relates to a new and improved thermosetting resinous material comprising a urea formaldehyde resin reaction product cured by means of a novel latent catalyst system.

Urea formaldehyde resins in a thermoplastic stage are widely used molding materials, employed, for example, on a large scale in the formation of many molded and/or pressed thermosetting products. One of the more important uses of urea formaldehyde resins is in the formation of particle board in the forest products industry.

As is well known, urea formaldehyde resins require both acid and heat to cure within a reasonable time. In the case of particle board, the acid required generally is supplied by the natural acidity of the wood chips or particles.

In order to obtain a faster cure of the urea formaldehyde resin, it has heretofore been proposed to add an acidic material, i.e., a curing catalyst, prior to use. However, it has been found that adding an acidic material generally provides a mixture of resin and catalyst having only a short storage life and difficulties often arise in that the mixture tends to set up or cure before it is used, especially if exposed to heat. Further, resins catalyzed in this manner sometimes tend to overcure as evidenced by degradation of the strength properties of the cured product after the curing cycle, e.g., in the case of particle board after removal from the press.

In view of such difficulties, it heretofore has been suggested to employ a so-called "latent catalyst" which will rapidly release the acid necessary for curing on exposure to heat, as, for example, the heat normally employed during the conventional molding or pressing operations and also will be relatively inert and stable at room temperature, thus permitting premixing of the urea formaldehyde with the latent catalyst and yet maintaining suitable storage life.

An important factor in the success of any latent catalyst system is its ability to generate enough acid in situ to cure the resin adequately but not so much as to cause an overcure and/or subsequent degradation of the reaction product. Further, it is important that the resin-catalyst mixture have an extended storage life under commercial use conditions.

One such prior latent catalyst is trimethyl phosphate. However, it has not proved to be an entirely satisfactory material; more specifically, in many applications it does not provide enough catalyst activity to be useful in practice, e.g., in the commercial manufacture of particle board using different types of wood chip materials as fillers.

Accordingly, it is a principal object of the present invention to avoid the difficulties heretofore encountered with latent catalysts and to provide a new and improved latent catalyst system for urea formaldehyde resins.

It is a further object of the invention to provide a latent catalyst system for urea formaldehyde resins which is highly effective, yields an uncured latent catalyzed resin mixture having an excellent storage life and use characteristics and on curing, a satisfactory product.

These and other objects and advantages of the present invention will appear more fully in the following description.

Broadly, the present invention avoids the prior difficulties by providing a latent catalyst composition comprising a mixture of a triester of phosphoric acid, e.g., a triaryl or trialkyl phosphate or alkyl aryl combinations thereof, notably trialkylphosphates, especially trimethyl phosphate, which is preferred at present, and an activator therefor, the activator being selected from the group consisting of trialkyl phosphites, especially trimethyl phosphite, which is preferred at present, and alkyl alkanesulfonates, such as n-butyl methanesulfonate, and/or mixtures of such activators.

The terms "alkyl" and "alkane" as used in the specification and claims is intended to refer to various lower alkyl (or corresponding alkane) groups such as methyl, ethyl, propyl, butyl, isopropyl, isobutyl, and the like, methyl at present being preferred. The term "aryl" is intended to refer to groups such as phenyl, benzyl, tolyl, xylyl, and the like.

Illustrative phosphates are trimethyl phosphate, triethyl phosphate, tripropyl phosphite, triphenyl phosphate, methyl diphenyl phosphate, dimethyl phenyl phosphate and/or mixed methyl phenyl phosphates. Typical phosphites are trimethyl phosphite, triethyl phosphite, tributyl phosphite, and the like.

A presently preferred embodiment of this invention comprises, in combination, a mixture of an uncured urea formaldehyde resinous material containing a latent catalyst comprising a trialkyl phosphate in small but effective amount and a suitable amount, generally considerably less, of a triggering or activator material, preferably a trialkylphosphite; and, of course, the resultant cured material. A specifically preferred latent catalyst of this invention comprises a mixture of trimethylphosphate and a smaller amount of trimethylphosphite.

Generally the phosphoric acid triester, especially the trialkyl phosphate, and preferably trimethylphosphate, can be employed in amounts ranging from about 0.1% to 1.0% by weight of the uncured urea formaldehyde mixture, and preferably in amount of about 0.25% by weight. The phosphite activator, preferably a trialkylphosphite and notably trimethylphosphite, generally can be employed in a somewhat smaller amount, typically of the order of about 0.01% to 0.5% by weight of the uncured urea formaldehyde mixture and preferably in an amount of about 0.1% by weight.

Despite prior attempts to employ trimethylphosphate alone as a latent catalyst, it has been found that it often is unsatisfactory in use due primarily to an inability to liberate acid fast enough. Similarly, trimethylphosphite used alone does not prove effective as a practical latent catalyst because of its instability in the resin. Surprisingly, however, the combination thereof, for example, the combination of 0.25% by weight of trimethyl phosphate and 0.1% by weight of trimethylphosphite, added to a standard urea formaldehyde particle board binder resin approximately 20% decrease in cure time, e.g., a reduction of a standard cure of 6½ minutes to 5½ minutes. It will be appreciated that since cure or press time is directly related to particle board production rates, this invention permits production increases of the order of 15% to 20%, a matter of considerable commercial importance.

In the practice of this invention, the composition of the urea formaldehyde resin is not critical and any conventional commercial resin, especially a water-dispersible resin, such as Dion 470–A, can be used. In such resins the molar ratio of formaldehyde to urea usually is in the range of about 2.5 to 1 and 1.3 to 1 and the resins contain about 60 to 70% by weight of non-volatile solids. More specifically, urea-formaldehyde resins having a formaldehyde to urea molar ratio of about 1.35 to 1.45:1 are preferred.

In the preparation of a urea formaldehyde resin embodying this invention, the urea may be reacted with formaldehyde, e.g., aqueous formaldehyde such as a 30 to 65% by weight aqueous solution, in any conventional apparatus and manner to a moldable stage. In general, the reaction is desirably carried on in an aqueous solution to the desired degree of reaction as by heating the desired mixture of formaldehyde and urea, e.g. at 80° to 90° C., to obtain the desired viscosity, typically of the order of 200 to 300 centipoises. This thermoplastic material can, if desired, be dried and ground to form a molding powder.

While there has been reference to particle board as being a preferred end product made embodying the compositions and process of this invention, it will be appreciated that plywood is another suitable commercial application and that in general any conventional filler type material such as a cellulosic material, for example, alpha cellulose or other materials as wood flour, wood pulp, wood particle, newsprint, printed newspapers, sawdust shavings, walnut shell flour, ground corn cobs and the like may be employed either alone or in a mixture as fillers. Further, customary modifiers or additives with urea formaldehyde resins such as waxes (to decrease water absorption), lubricants, pigments, opacifiers and other coloring materials can be incorporated. In general, the proportions of filler and resin can be varied as is customary and are dictated by the application intended.

In order that those skilled in the art may more completely understand the present invention and the preferred method by which the same may be carried into effect, the following specific examples are offered wherein the percent values refer to percent by weight of dry wood chips unless otherwise indicated.

EXAMPLE 1

Sprayed onto Douglas fir wood chips (95% through a ⅛" screen) tumbling in a rotating container is a mixture of 6.5% (based on resin solids) of a water dispersible urea formaldehyde resin (having a molar ratio of formaldehyde to urea of about 1.35 to 1.0, a viscosity of about 250 centipoises, and 65% non volatile solids); 0.25% of trimethyl phosphate based on wet resin weight; 0.75% of a paraffin wax (Paracol 404N) and 0.035% based on wet resin weight of n-butyl methane sulfonate. From the resin coated chips, ¾" particle board is formed in a conventional manner via a heated hydraulic press. Using a 5½ minute total press cycle (initial pressure at 320 p.s.i.g. for 1 to 2 minutes, the remainder at 180 p.s.i.g. at a temperature of 320° F.) an average modulus of rupture (MOR) value is 2,542 p.s.i.g. and internal bond (IB) value is 86 p.s.i.g.

EXAMPLE 2

Following the procedure of Example 1 except that the latent catalyst consists of 0.25% trimethyl phosphate and 0.10% trimethyl phosphite, there are obtained boards having an average MOR of 1,792 p.s.i.g. and IB of 71.

EXAMPLE 3

Following the general procedure of Example 1 there are combined 1542 grams Douglas fir wood chips (4.5 moisture content)
197.5 grams urea formaldehyde catalyzed resin[1]
25.0 grams Paracol 404N wax
3.0 grams water The resin, wax and water are mixed and sprayed on the chips. At a press temperature of 320° F. a 5½ minute press cycle is carried out at 180 p.s.i.g. with an initial press at 320 p.s.i.g. and decompression in the last ½ minute. There is obtained a board having an average MOR of 2545 and an IB of 129.

By way of comparison, standard 6½ minute press runs of the same type of urea formaldehyde resins (containing no catalyst) typically yield a MOR of 1832 and an IB of 72. Thus it will be appreciated that by the practice of this invention it is possible to utilize a 5½ minute cure cycle instead of the standard 6½ minute cycle and still obtain equivalent if not substantially better products.

It is to be understood that although the invention has been described with specific reference to particular embodiments thereof, it is not to be so limited since changes and alterations therein may be made which are within the full intended scope of this invention as defined in the appended claims.

What is claimed is:
1. A composition of matter comprising an uncured urea formaldehyde resin containing as a latent catalyst a triester of phosphoric acid and as an activator therefor trialkylphosphite.
2. A composition according to claim 1 wherein the triester is a trialkyl phosphate.
3. A composition according to claim 1 wherein the latent catalyst comprises trimethylphosphate and trimethylphosphite.
4. A composition according to claim 1 wherein the latent catalyst comprises trimethylphosphate in an amount within the range of about .1 to 1.0% by weight of the urea formaldehyde resin and trimethylphosphite in an amount within the range within about 0.01 to 0.5% by weight of the urea formaldehyde resin.
5. In the preparation of a urea formaldehyde reaction product, the improvement which comprises employing as a latent catalyst for curing an uncured urea formaldehyde resin a trialkyl phosphate and as an activator therefore a trialkylphosphite.
6. In the preparation of a urea formaldehyde reaction product, the improvement which comprises employing as a latent catalyst for curing an uncured urea formaldehyde resin trimethyl phosphate and trimethyl phosphite.
7. The process of preparing a crued urea formaldehyde resin which comprises curing such resin in the presence of a latent catalyst comprising a triester of phosphoric acid and as an activator a trialkylphosphite.
8. A cured urea formaldehyde resin prepared by the process of claim 7.

---

[1] Containing 0.25% Me₃PO₄ and 0.125% Me₃PO₃ based on wet resin weight.

(References on following page)

References Cited

UNITED STATES PATENTS

| | | | |
|---|---|---|---|
| 2,250,662 | 7/1941 | Walter | 260—69 |
| 2,250,663 | 7/1941 | Walter | 260—69 |
| 2,274,447 | 2/1942 | Hodgins et al. | 26—71 |
| 2,340,331 | 2/1944 | Knutson et al. | 252—53 |
| 2,793,225 | 5/1957 | Scott | 260—461 |
| 2,960,529 | 11/1960 | McCall et al. | 260—461 |
| 3,027,349 | 3/1962 | Bahr et al. | 260—457 |
| 3,184,495 | 5/1965 | Baranauckas et al. | 260—461 |
| 3,184,496 | 5/1965 | Baranauckas et al. | 260—461 |
| 3,136,805 | 6/1964 | Baranauckas et al. | 260—461 |

OTHER REFERENCES

Phosphorus and Its Compounds, vol. I, Van Wazer, 1958, pp. 377–384, Chemical Industries, vol. 51, 1942, Adler et al., pp. 516–522, Technology of Plastics and Resins, Mason et al., 1945, p. 196.

WILLIAM H. SHORT, *Primary Examiner.*

H. SCHAIN, *Assistant Examiner.*

U.S. Cl. X.R.

117—148; 252—426; 260—17.3, 28, 39, 963, 967